United States Patent [19]

Dupen

[11] 4,357,297
[45] Nov. 2, 1982

[54] APPARATUS FOR THERMALLY INSULATING NUCLEAR REACTOR PRIMARY VESSELS

[75] Inventor: Clive F. G. Dupen, Simsbury, Conn.

[73] Assignee: Electric Power Research Institute, Inc., Palo Alto, Calif.

[21] Appl. No.: 33,674

[22] Filed: Apr. 26, 1979

[51] Int. Cl.³ .................. G21C 11/08; G21C 17/00
[52] U.S. Cl. .................................. 376/290; 376/247; 376/289; 376/249
[58] Field of Search ................. 176/40, 65, 38, 87, 176/DIG. 2, 78, 19 R; 73/49.1–49.5

[56] References Cited

U.S. PATENT DOCUMENTS

| | | | |
|---|---|---|---|
| 3,300,388 | 1/1967 | Jerman et al. | 176/19 R |
| 3,347,747 | 10/1967 | West et al. | 176/35 |
| 3,421,977 | 1/1969 | Hutchinson et al. | 176/87 |
| 3,549,494 | 12/1970 | Germer | 176/19 R |
| 3,862,884 | 1/1975 | Jabsen | 176/78 |
| 3,890,197 | 6/1975 | Butts et al. | 176/78 |
| 3,996,101 | 12/1976 | Marmonier et al. | 176/78 |
| 4,032,399 | 6/1977 | Defauchy et al. | 176/40 |
| 4,043,866 | 8/1977 | Durston | 176/65 |
| 4,046,629 | 9/1977 | Durston et al. | 176/40 |
| 4,055,465 | 10/1977 | Lemercier | 176/87 |
| 4,115,192 | 9/1978 | Jogand | 176/65 |
| 4,154,651 | 5/1979 | Kenworthy et al. | 176/40 |

FOREIGN PATENT DOCUMENTS

| | | | |
|---|---|---|---|
| 2804560 | 10/1978 | Fed. Rep. of Germany | 176/DIG. 2 |
| 2260743 | 5/1975 | France | 176/40 |
| 2315054 | 1/1977 | France | 176/87 |
| 2315055 | 1/1977 | France | 176/40 |
| 870315 | 6/1961 | United Kingdom | 176/87 |

*Primary Examiner*—Harvey E. Behrend
*Attorney, Agent, or Firm*—Flehr, Hohbach, Test, Albritton & Herbert

[57] ABSTRACT

An apparatus for thermally insulating nuclear reactor primary vessels. The apparatus includes a plurality of cylindrical reflective metal plates located within the primary vessel for thermally insulating the side walls of the vessel from the temperatures generated by the reactor. The reflective plates are radially spaced apart and are positioned in an annular inverted U-shaped chamber that traps inert gas around the reflective plates. The plates and the annular chamber insulate the side walls of the primary vessel from the temperatures generated by the reactor.

8 Claims, 9 Drawing Figures

U.S. Patent    Nov. 2, 1982    Sheet 1 of 2    4,357,297
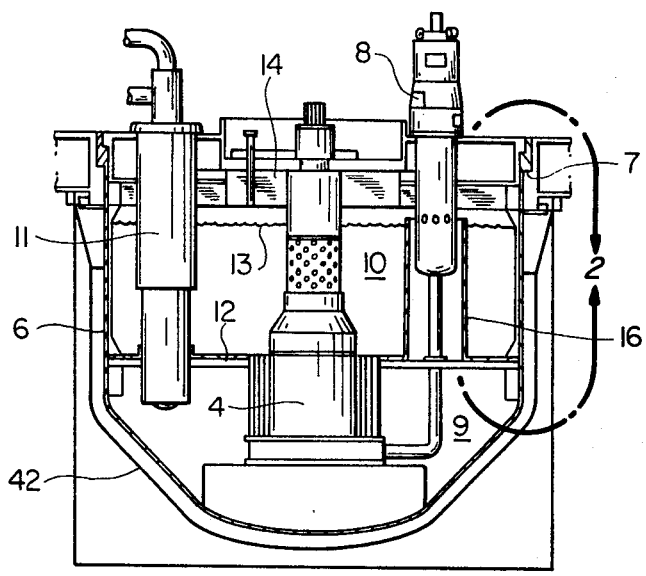
FIG_1
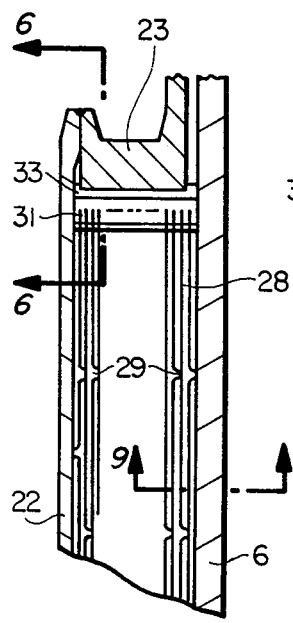
FIG_5
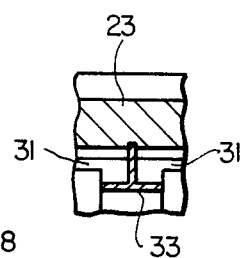
FIG_6
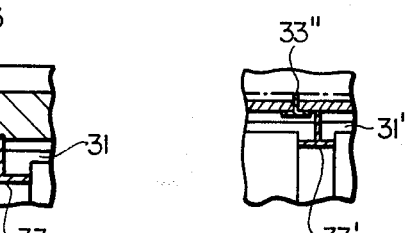
FIG_8
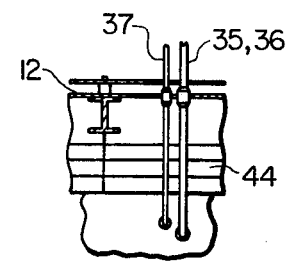
FIG_4
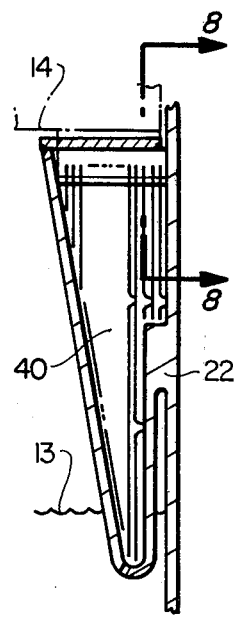
FIG_7
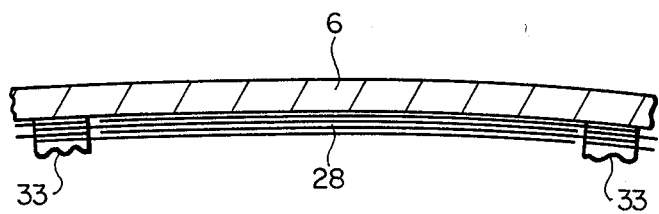
FIG_9

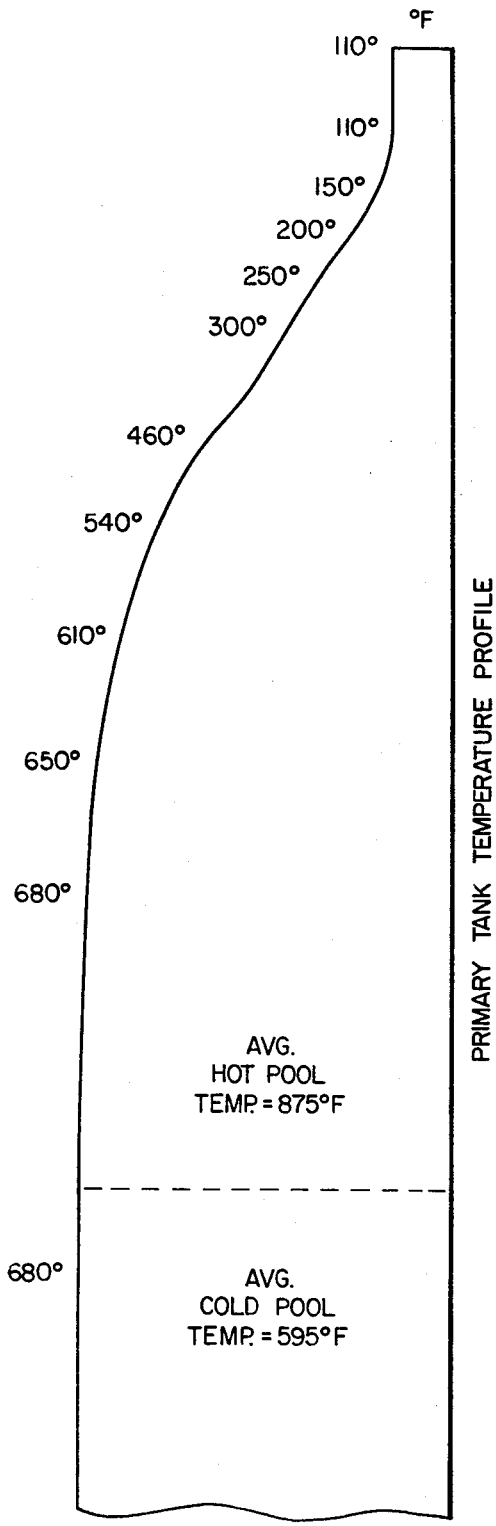
FIG_3
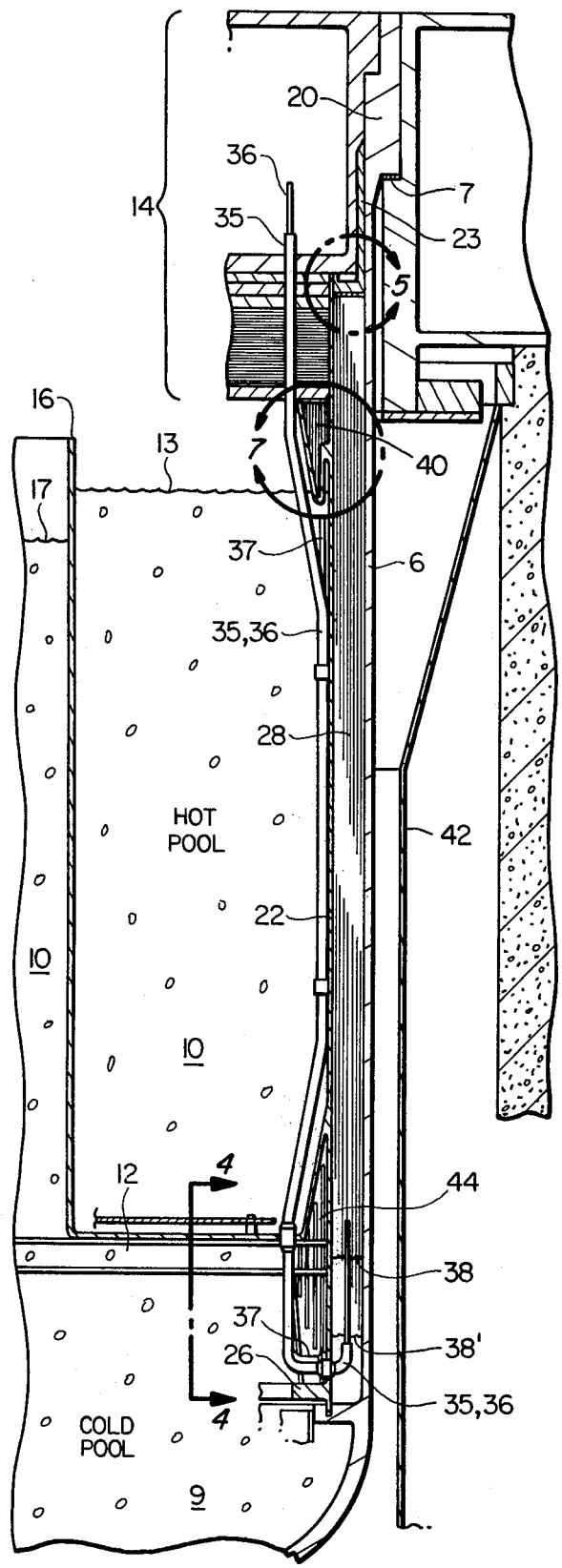
FIG_2

APPARATUS FOR THERMALLY INSULATING NUCLEAR REACTOR PRIMARY VESSELS

This invention generally relates to nuclear reactors and, more particularly, to cooling systems for primary vessels.

In general, the temperature of the walls of a primary vessel or tank is controlled by the thermal resistance of the insulation in combination with the heat removal systems which cool the supporting structure of the reactor and its surrounding cavity. The thermal insulation protects the walls of the primary tank against axial temperature gradients, transient temperatures, and high temperatures per se. Such insulation is necessary in order to protect the tank and its internal structures from thermal stresses which could endanger the integrity of the primary coolant boundary.

The present invention has application in any nuclear reactor including but not limited to pressurized water, boiling water, gas cooled and liquid metal cooled reactors. The preferred embodiment is disclosed in connection with a liquid metal cooled nuclear reactor because such reactors operate at higher temperatures. Typically, these reactors operate within a temperature range of between 650° F. and 950° F. In addition, sodium has a very high coefficient of heat transfer so that during the operation of these reactors thermal transients rapidly propagate through the system and can cause severe thermal stresses.

The general problem of insulating a primary tank in order to limit temperature level, gradients, and transients, occurs in both loop and pool type reactor designs. The temperature gradient problem, however, increases with the size of the reactor vessel. The axial gradient stress increases as the square root of the product of the wall radius and the thickness. Also, the transient radial gradient stress increases with the wall thickness.

FIG. 1 illustrates a typical sodium cooled nuclear reactor. This reactor is a pool type reactor and includes a reactor core 4 which is supported within a primary tank 6. The primary tank is suspended from a steel support 7 which is mounted on top of the side wall of the concrete reactor cavity. The reactor further includes a plurality of pumps 8 which circulate the sodium coolant through the reactor during operation. One such pump is illustrated in FIG. 1. The pumps draw relatively cool sodium from a cold pool 9 located in the bottom of the primary tank and discharge it into the bottom of the reactor core 4. The sodium then flows upward through the core while being heated therein and is discharged into the hot pool 10. The sodium thereafter flows downward through a plurality of intermediate heat exchangers 11 and is discharged back into the cold pool. One such heat exchanger is illustrated in FIG. 1.

Within the intermediate heat exchanger 11, FIG. 1 the heat from the core is transferred to a secondary sodium coolant which is circulated between the intermediate heat exchanger 11 and a plurality of steam generators (not shown). The hot and cold pools are separated by a horizontal structure 12 that forms the boundary between the two pools and includes a plurality of vertical wells 16 that thermally separate each pump 8 from the hot pool. Only one of the pump wells is shown in FIG. 1. The reactor operates at nominally atmospheric pressure and has a level of sodium 13 in the hot pool which is substantially below the reactor cover 12. The space above the hot pool is filled with an inert gas such as helium.

In the past the principal technique for cooling the walls of primary tanks or vessels has been bypass cooling. In bypass cooling a portion of the flow of the relatively cold coolant is directed against the side walls of the primary tank. In the reactor of FIG. 1, the bypass coolant is obtained from the cold pool 9 and is directed against the inner side wall of the primary tank. In effect, a moving barrier of relatively cold sodium is interposed between the hot pool 10 and the primary tank wall 6.

In one bypass flow design a portion of the discharge from the coolant circulating pump is first directed against the inside of the primary tank in an upward direction. The coolant is thereafter redirected downward by a baffle and flows back into the cold pool. In this design there is an upward flow of sodium from the cold pool, thermal contact between the cold sodium and the primary tank wall and a downward flow of sodium in the space between the hot pool and the upward flowing cold sodium.

An alternative approach has been to direct the cold sodium from the discharge of the pump upward along the sidewall of the hot pool and then downward along the inner side wall of the primary tank. In this alternative design there is a wide, annular space between the side wall of the hot pool and the primary tank.

Although bypass cooling is an accepted technique, there are several problem areas which cause concern. The principal problem with bypass cooling is that a large temperature difference is developed across the structural boundaries between the hot pool and the bypass cooling flow. This temperature difference is typically about 300° F. during normal operation. This difference can cause severe thermal stresses to be developed during accident conditions.

Another problem with bypass cooling is that the system cannot be designed to optionally function at constant temperature at every power level. Most reactors are operated with a fairly constant cooling outlet temperature so that the cooling requirement for the vessel wall is preferably constant and independent of power level. The rate of bypass coolant flow, however, is a function of the output of the circulating pump. The result is that the flow of bypass coolant varies with power level and the amount of heat transfer and resultant vessel wall temperatures likewise vary.

A further problem with bypass cooling is that the bypass coolant itself is subject to temperature transients. The bypass flow is typically taken from the cold pool which is subject to temperature transients such as the stoppage of the flow of secondary sodium through the intermediate heat exchanger. This stoppage causes a sharp transient in the temperature of the cold pool because the primary sodium flowing through the intermediate heat exchanger is no longer cooled and hot sodium is dumped into the cold pool.

Still another problem with bypass cooling is that it decreases the overall output of the reactor. Bypass cooling requires the diversion of a portion of the flow of coolant away from the reactor core. This diversion represents an efficiency loss because the net electrical output of the reactor is decreased.

An additional technique for cooling the walls of nuclear reactors is disclosed in U.S. Pat. No. 4,055,465 issued on Oct. 25, 1977 to La Mercier.

A principal object of the present invention is to reduce the amount of axial temperature stresses in the primary tank of a nuclear reactor. In FIG. 1, there is a vertical temperature gradient between the point of support 7 and the horizontal structure 12. This temperature gradient, which is in the axial direction, and the rate of change of this temperature gradient causes meridian bending stresses. Reduction of axial temperature stresses is a principal object of this invention because it has been observed in large breeder reactors that this is the controlling stress consideration. If adequate provisions are made to control axial temperature stresses, then both steady state and transient radial temperature gradients usually provide no difficulties.

A further object of the present invention is to reduce the temperature of the primary tank at the point of support to approximately 100° F. In the embodiment of FIG. 1, the point of support is the ledge 7. Such a low temperature is necessary at the point of support in order to reduce differential thermal expansions which occur at that point. Typically, in the design of a top supported primary tank the change of the temperature gradient near the point of support produces the most intense stresses in the primary tank.

A further object of the present invention is to design a passive temperature insulating apparatus suitable for all power levels and for constant temperature operation. In addition, the apparatus must limit the stresses caused by thermal gradients to acceptable values for approximately 40 years. The apparatus must also resist chemical attack from sodium and must avoid the formation of particulate materials that could circulate through the reactor.

An additional object of the present invention is to insure that the integrity of the primary tank of the reactor is maintained during emergency conditions and that the reactor reliably functions without requiring in-vessel maintenance for a period of approximately 40 years.

The objects and advantages of the present invention are achieved by an apparatus for thermally insulating a primary tank in a nuclear reactor. The apparatus includes a plurality of vertically oriented, reflective metal plates located within the primary tank and around the outside of the reactor core for thermally insulating the side walls of the tank from the temperatures generated by the reactor. The reflective metal plates are radially spaced apart and each has an arcuate cross section.

Additional objects and features of the invention will appear from the following description in which the preferred embodiment has been set forth in detail in conjunction with the accompanying drawings.

FIG. 1 is a side elevational view, in section, of a pool type liquid metal cooled nuclear reactor.

FIG. 2 is a side elevational view, broken away and in section, taken along line 2—2 of the side wall of the nuclear reactor of FIG. 1.

FIG. 3 is a graph of the temperature distribution of the primary tank side wall in degrees Fahrenheit. The abscissa of the graph corresponds to the vertical dimensioning of the nuclear reactor of FIG. 2.

FIG. 4 is a side elevational view, broken away and in section, taken along line 4—4 of the apparatus of FIG. 2.

FIG. 5 is a side elevational view, broken away and in section, taken along line 5—5 of the apparatus of FIG. 2.

FIG. 6 is a side elevational view, broken away and in section, taken along line 6—6 of the apparatus of FIG. 5.

FIG. 7 is a side elevational view, broken away and in section, taken along line 7—7 of the apparatus of FIG. 2.

FIG. 8 is a side elevational view, broken away and in section, taken along line 8—8 of the apparatus of FIG. 7.

FIG. 9 is a bottom plan view, broken away and in section, taken along line 9—9 of the apparatus of FIG. 5.

For the purposes of explanation, the preferred embodiment is described herein as it is incorporated into a pool-type liquid metal cooled fast breeder reactor. A side elevational view of such a reactor is illustrated in section in FIG. 1. It should be understood, however, that the present invention has application in both loop and pool-type nuclear reactors as well as reactors which are cooled by water, gas and liquid metal (sodium).

The nuclear reactor illustrated in FIG. 1 includes a reactor core 4, a primary tank 6, a coolant circulating pump 8, and an intermediate heat exchanger 11. In the actual plant there are a plurality of circulating pumps and intermediate heat exchangers but only one of each is illustrated in FIG. 1. The sodium coolant is contained in the reactor in a cold pool 9 and in a hot pool 10. The hot and cold pools are separated by a horizontal structure 12 which is a structural and thermal barrier that extends horizontally across the reactor and contains a plurality of cylindrical pump wells 16. These pump wells shroud each pump from the heat of the hot pool. The free surface of the sodium in the hot pool is indicated by numeral 13 and the free surface of the sodium in the cold pool 17, FIG. 2 is located within the pump wells 16.

Referring to FIG. 2, the primary containment for the sodium coolant and the cover gas is the primary tank 6. Since the reactor is a pool-type reactor, the primary tank is generally cup-shaped and has no penetrations through its side and bottom walls. The fission products are thereby contained within the boundaries of the primary tank at all times. The upper portion of the primary tank terminates in an upper cylindrical support skirt 20. The support skirt and in turn the entire reactor are supported at point 7 from the ledge in the reactor cavity wall. The cavity wall is fabricated from concrete and the reactor cooling system is designed so that the point of support 7 never exceeds 150° F.

The thermal insulating apparatus of the present invention includes a cylindrical metal liner 22, FIG. 2 located vertically along the inner side wall of the primary tank. The liner is the first thermal barrier to the hot sodium and is in direct fluid contact with the sodium in the hot pool. The purpose of the liner is to form, in combination with the reactor vessel wall, an impermeable boundary to the gas-filled annular space and thus provide a satisfactory gaseous environment for the reflective insulation. The liner also forms the side wall of a trapped gas space as described below. The liner is supported from the upper support skirt 20 by a cylindrically shaped member 23 having an L-shaped cross section as illustrated in FIGS. 2 and 5. The liner extends from the bottom of the L-shaped member 23 down to the supporting structure 26, FIG. 2, located below the horizontal structure 12. The configuration of the L-shaped member is determined by fabrication and assembly considerations.

Referring to FIG. 2, between the liner 22 and the primary tank side wall 6 and a plurality of vertically oriented, reflective metal plates 28. These plates are radially spaced apart around the outside of the core of the reactor and each has an arcuate cross-section. These plates are illustrated in detail in FIGS. 5 and 9. The purpose of these reflective metal plates is to thermally insulate the side walls of the primary tank from the temperatures generated by the reactor. Referring to FIG. 9, the plates are vertically segmented into arcuate sections to permit the lateral thermal expansion. In addition, the plates each contain a plurality of indentations 29, FIG. 5 which preserve the stand-off spacing between adjacent plates. The indentations also reduce convective heat transfer between the plates by minimizing the circulation of inert gas and sodium vapor in the trapped gas space which is described in detail below. The vertically segmented cylindrical plates are circumferentially staggered as illustrated in FIG. 9 in order to prevent direct radiative heat transfer from the liner 22 to the primary tank through the vertical slots between the arcuate sections.

The metal plates 28, FIG. 2 reduce the radiation heat transfer from the hot pool in the radial direction by presenting a large vertical surface area. The plates are dimensioned to minimize their thickness and to incorporate as many plates as possible into the space between the liner 22 and the wall of the primary tank 6. In one embodiment there are twenty-three reflective plates each 0.1" thick, and spaced apart 0.5". The plates have a 0.06" cold clearance and each arcuate section has a 4' vertical length. The resulting arrangement gives an effective thermal conductivity of between 0.3 to 0.6 BTU/H-ft-°F.

Referring to FIGS. 5 and 6, each reflective plate 28 has a rigid supporting member attached along its upper margin. The supporting members engage two T-shaped brackets 33. The T-shaped brackets are radially spaced around the reactor and are welded to the bottom of the L-shaped member 23. The supporting members along with the reflective plates hang from the T-shaped brackets and the spacing between the reflective plates is maintained by the thickness of the supporting members 31 and the indentations 29.

Referring to FIG. 2, the primary tank 6, the upper support skirt 20, the L-shaped member 23, and the liner 22 together form a trapped gas annulus. The trapped gas annulus is open at the bottom, hermetically sealed at the top, and has an inverted U-shaped cross section. When the primary tank is filled with sodium, the trapped gas annulus contains within its boundary a bubble of inert gas which is supplemented during filling via the makeup line 35 described below. The bubble prevents the reflective plates 28 which are located within this annulus from coming into fluid contact with the liquid sodium. The purpose of this construction is to eliminate the conductive heat transfer between the reflective plates and the primary tank which would occur if the plates were submerged in sodium. The gas annulus is open at the bottom so that in the event that in-leakage of liquid coolant occurs, it will readily drain. The level of sodium within the trapped gas annulus varies with power level. The level is illustrated in FIG. 2 at 40% power 38 and at 100% power 38'. The free surface 17 of the sodium in the cold pool 10 is located within the pump well 16, FIG. 2 and a hydrostatic head is developed between the cold pool free surface 17 and the level of sodium in the bottom of the trapped gas annulus. The level of sodium in the annulus falls as the reactor power level increases because as the power level increases, the level of the free surface in the pump well decreases.

The top of the reactor is sealed by a cover 14, FIGS. 1 and 2. The cover includes both insulation and radiation shielding and forms no part of the present invention. The open space between the bottom of the cover and the hot pool operating level 13 is the cover gas space which is filled with helium. Located along the side wall of the primary tank in the cover gas space is a series of vertically oriented, reflective metal plates 40. These plates are arranged in a triangular shaped array which is shown in detail in FIG. 7. These reflective plates are fabricated and operate in the same manner as the reflective plates 28, FIG. 5 described above. The reflective plates 40 are suspended by a series of T-shaped brackets 33', 33" which are welded to the bottom of the cover 14 as illustrated in FIG. 8. The primary purpose of these plates is to control the axial temperature gradient in the liner 22. The reflective plates 40 also supplement the larger reflective plates 28 in passively insulating the primary tank side wall from the temperatures generated by the reactor. These plates are positioned to insure that the temperature gradient from the operating level 13 to the point of support 7 is smooth and without excessive thermal stresses. The reflective plates 28, 40 in combination with the cover insulation establish the temperature profile illustrated in FIG. 3.

There is an additional triangular array of metal plates 44 located adjacent to the liner 22 between the hot pool 10 and the cool pool 9. These metal plates, which are vertically oriented and extend around the circumference of the reactor, provide a variable resistance to thermal conduction and so reduce the temperature gradient between the hot pool and the cold pool. The plates in this set are fully immersed in the sodium in the cold pool and are therefore considerably less efficient thermal barriers than the reflective plates.

Referring to FIGS. 1 and 2, the primary tank 6 is positioned within a guard tank 42. The guard tank is an emergency boundary to protect against any sodium leakage from the primary tank. The annular space between the primary tank and the guard tank is filled with an inert gas and is used for in-vessel inspection of the primary tank. The outside of the guard tank is insulated with conventional ceramic fibrous insulation and is cooled by a cavity heat-removing system (not shown).

The trapped gas annulus formed by the side walls of primary tank 6, the bottom of the L-shaped member 23 and the liner 28 is placed into operation by purging the oxygen from the primary tank and filling the primary tank with an inert gas such as helium. Thereafter, sodium is added to the primary tank and it is filled to the operational level 13. During the process of filling the primary tank, the sodium traps a bubble of helium in the annulus. After filling the primary tank, the level of sodium in the annulus is adjusted by adding helium through a make-up line 35, FIGS. 2, 4.

During operation, the level of sodium in the annulus is monitored by measuring its pressure through the line 36. To minimize the number of penetrations through the reactor cover 14, the monitoring line 36 is located inside of and coaxial with the make-up line 35. If the level of sodium in the trapped gas annulus falls excessively, the helium in the annulus is vented through a vent line 37. The vent line directs the helium up the side wall of the primary tank to a point located just below the hot pool operating level 13. The vent line prevents bubbles of helium from being drawn into the circulating pump 8, FIG. 1, and thereafter flowing through the reactor and causing reactivity perturbations.

It should be understood that the apparatus described above constitutes a passive thermal insulating system. The apparatus does not require any energy input from the reactor and does not degrade the efficiency and performance of the reactor.

It should further be understood that this apparatus is used in combination with the insulation on the outside side walls of guard tank 42, FIG. 1 and a reactor cavity heat removing system (not shown). The temperature gradient from the sodium hot pool 10 to the guard tank 42 can be altered by adjusting both the amount of insulation used inside of the primary tank and on the outside of the guard tank. By proportioning this insulation any primary tank temperature or temperature gradient along the side wall of the primary tank can be attained.

Thus, although the best mode contemplated for carrying out the present invention has been herein shown and described, it will be apparent that modification and variation may be made without departing from what is regarded to be the subject matter of the invention.

What is claimed is:

1. In a nuclear reactor including a primary tank having a vertically extending annular side wall and containing therein a top hot pool and a bottom cold pool of coolant separated from one another by a horizontally extending barrier, an arrangement for thermally insulating the inner circumferential surface of said tank side walls, said arrangement comprising:
   (a) a cylindrical metal liner located concentrically within said tank and spaced inwardly of said inner circumferential surface in confronting relationship therewith whereby to define an axially extending annular space therebetween, said space being filled with an inert gas and having an opened bottom end in fluid communication with said cold pool whereby coolant leaking into said space from either of said pools will drain to said bottom open end;
   (b) means for hermetically sealing the top end of said space;
   (c) a plurality of vertically extending, radially spaced apart, reflective metal plates having arcuate cross-sections located within and together extending the entire circumferential length of said annular space for reducing radiative heat transfer radially across said space, thereby thermally insulating said tank side wall from the temperatures generated by the reactor, each of said plates having a plurality of indentations in its surface for providing stand-off spacing between adjacent plates and thereby reducing convective heat transfer radially across said space and for further facilitating drainage of any liquid coolant which appears between said plates; and
   (d) means for supporting said plates in position within said space.

2. In a nuclear reactor including a primary tank having a vertically extending annular side wall and containing therein a top hot pool and a bottom cold pool of coolant separated from one another by a horizontally extending barrier, an arrangement for thermally insulating the inner circumferential surface of said tank side walls, said arrangement comprising:
   (a) a cylindrical metal liner located concentrically within said tank and spaced inwardly of said inner circumferential surface in confronting relationship therewith whereby to define an axially extending annular space therebetween, said space being filled with inert gas and having an opened bottom end in fluid communication with said cold pool;
   (b) means for hermetically sealing the top end of said space;
   (c) a plurality of vertically extending, radially spaced apart, reflective metal plates having arcuate cross-sections located within and extending the length of said annular space for thermally insulating said tank side wall from the temperatures generated by the reactor, each of said plates having a plurality of indentations in its surface for providing stand-off spacing between adjacent plates and for reducing convective heat transfer between points in said reactor and said primary tank;
   (d) means for supporting said plates in position within said space;
   (e) first tubular means extending into said space from outside said tank for injecting inert gas into said space; and
   (f) second tubular means extending into said space from outside thereof for monitoring the gas pressure within said space.

3. An arrangement as in claim 2 wherein each of said first and second tubular means includes at least one tube extending into said space from outside thereof and wherein one of said tubes is concentrically positioned around the other, said concentrically positioned tubes extending through a cooperating opening in said lining.

4. An arrangement as in claim 2 including a plurality of additional vertically extending, radially spaced apart, reflective metal plates shorter axially than said first-mentioned plates and liner extension means positioned on the innermost surface of said liner and integrally formed with a top annular section of said liner for supporting said additional plates in position adjacent to said liner.

5. An arrangement as in claim 4 including a plurality of second additional vertically extending, radially spaced apart, metal plates, shorter axially than said first mentioned plates and second liner extension means positioned on the innermost surface of said liner and integrally formed with a bottom annular section of said liner for supporting said second additional plates in position adjacent to said liner.

6. An arrangement as in claim 2 wherein each of said reflective plates has a rigid supporting member attached along its upper margin, said members along with the reflective plates being connected with a plurality of radially positioned bracket members connected with said tank, said bracket members having T-shaped cross sections, said support members and bracket members serving as said supporting means.

7. An apparatus as in claim 2 wherein the reflective plates are vertically segmented into arcuate sections.

8. An apparatus as in claim 2 wherein the nuclear reactor is cooled by a flow of liquid metal and the reflective plates are fabricated from stainless steel.

* * * * *